US012607261B2

(12) United States Patent
Deeg et al.

(10) Patent No.: US 12,607,261 B2
(45) Date of Patent: Apr. 21, 2026

(54) PNEUMATIC PISTON AND METHOD FOR PRODUCING SAME

(71) Applicant: Knorr-Bremse Systeme Fuer Nutzfahrzeuge GmbH, Munich (DE)

(72) Inventors: Markus Deeg, Eberdingen (DE); Friedbert Roether, Cleebronn (DE); Michael Giannuzzi, Gemmrigheim (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 18/870,683

(22) PCT Filed: Apr. 12, 2023

(86) PCT No.: PCT/EP2023/059521
§ 371 (c)(1),
(2) Date: Dec. 1, 2024

(87) PCT Pub. No.: WO2023/232334
PCT Pub. Date: Dec. 7, 2023

(65) Prior Publication Data
US 2025/0243935 A1      Jul. 31, 2025

(30) Foreign Application Priority Data
Jun. 2, 2022    (DE) ..................... 10 2022 113 946.8

(51) Int. Cl.
| | |
|---|---|
| *F16J 9/12* | (2006.01) |
| *B60T 17/08* | (2006.01) |
| *F16J 9/26* | (2006.01) |

(52) U.S. Cl.
CPC ................. *F16J 9/12* (2013.01); *B60T 17/08* (2013.01); *F16J 9/26* (2013.01)

(58) Field of Classification Search
CPC ........ B60T 13/569; B60T 8/327; B60T 17/08; F16J 15/56
See application file for complete search history.

(56) References Cited

U.S. PATENT DOCUMENTS

| | | | |
|---|---|---|---|
| 2,587,405 A | 2/1952 | Stevens et al. | |
| 2007/0186985 A1* | 8/2007 | Potter ................... | B60T 13/683 |
| | | | 137/596.16 |
| 2011/0297494 A1* | 12/2011 | Shaw ...................... | B60T 8/327 |
| | | | 188/152 |

FOREIGN PATENT DOCUMENTS

| | | |
|---|---|---|
| DE | 10147981 A1 | 4/2003 |
| DE | 102015219631 A1 | 9/2016 |

(Continued)

OTHER PUBLICATIONS

International Search Report for PCT/EP2023/059521, Issued Jul. 25, 2023.

(Continued)

*Primary Examiner* — Abiy Teka
(74) *Attorney, Agent, or Firm* — NORTON ROSE FULBRIGHT US LLP

(57) ABSTRACT

A pneumatic piston for an electropneumatic modulator in which the modulator includes a piston housing with a chamber for receiving the pneumatic piston. The pneumatic piston includes a sealing element for sealing an intermediate space between the pneumatic piston and the piston housing; a piston body with a recess for receiving the sealing element; and a securing element configured to fix the sealing element in the recess in a form-fitting manner.

10 Claims, 6 Drawing Sheets

(56) References Cited

FOREIGN PATENT DOCUMENTS

| DE | 102018121716 A1 * | 3/2020 | ............. B60T 15/36 |
|----|----|----|----|
| DE | 102018121721 A1 | 3/2020 | |
| GB | 2497825 A | 6/2013 | |
| WO | 2020048697 A1 | 3/2020 | |

OTHER PUBLICATIONS

R. Bourdon et al. "Auf Kurzem Weg Entformen" Kunstsoffe, Carl Hanser Verlag, München, Germany, vol. 88, No. 9, Sep. 1, 1998, ISSN: 0023-5563, XP000790486, including machine English translation thereof.

* cited by examiner

1

PNEUMATIC PISTON AND METHOD FOR PRODUCING SAME

FIELD OF THE INVENTION

The present invention relates to a pneumatic piston, an electropneumatic modulator and a method for producing a pneumatic piston for the electropneumatic modulator.

BACKGROUND INFORMATION

Electropneumatic modulators are used, for example, in pneumatic brake systems for utility vehicles, in order to set an air pressure via a targeted electrical actuation of valves, in order thus to provide a desired brake pressure for a pneumatic brake.

German patent document DE 10 2018 121 716 A1, for example, discusses a conventional electropneumatic modulator and a pneumatic piston, wherein the piston has a hollow-cylindrical shape therein and is axially movable in a chamber of a piston housing. The pressure in the chamber is gradually increased or reduced, for example, via solenoid valves, which leads to an axial movement of the piston. A sealing action is provided between the piston and the housing via a sealing ring which is held below a covering plate. Here, the covering plate is welded to the piston body or is produced by way of staking.

This fastening may be disadvantageous, however, since great acceleration forces act in particular on a stop of the piston, which forces can lead to the welded joint breaking and therefore the sealing action of the piston no longer being reliably ensured within the piston housing.

There is therefore a requirement for alternative pneumatic pistons which ensure a more reliable sealing action of the piston with respect to the piston housing and withstand higher loads in the long term.

SUMMARY OF THE INVENTION

At least part of the abovementioned problems may be solved by a pneumatic piston as described herein, an electropneumatic modulator as described herein, and a production method as described herein. The further embodiments define further advantageous embodiments of the main descriptions herein.

The present invention relates to a pneumatic piston for an electropneumatic modulator. The modulator comprises a piston housing with a chamber for receiving the pneumatic piston. The pneumatic piston comprises a sealing element for sealing an intermediate space between the pneumatic piston and the piston housing, a piston body with a recess for receiving the sealing element, and a securing element which is configured to fix the sealing element in the recess in a positively locking manner. It goes without saying that the sealing element is configured to seal the intermediate space between the piston body and the housing only after an insertion of the pneumatic piston into the piston housing.

The pneumatic piston optionally comprises a locking element which is configured to lock the securing element on the piston body. The locking element is not mandatory, since the securing element can also be self-locking. The locking action comprises, in particular, an axial direction (linear movement direction of the piston), wherein a displacement or deflection in the radial direction is potentially possible or is prevented only after the insertion into the housing.

The locking element optionally comprises at least one of the following: a groove, at least one undercut, at least one hook-shaped projection. The locking element can be an inherent constituent part of the piston body and does not need to be an independent element. The groove can have a geometry, for example, such that the securing element can be introduced into the groove and is held in the axial direction.

The securing element optionally comprises one of the following:

a securing ring, in particular a snap ring, which can be latched into the groove, two half rings which can be locked by way of the groove and/or by way of the at least one undercut and/or by way of the at least one hook-shaped projection, a toothed or non-toothed corrugated washer with a diameter which is selected in such a way that the corrugated washer latches into the piston body during insertion, at least one projection which can be pushed into the at least one undercut and/or into the at least one hook-shaped projection (in order to be held there), at least one indent, into which a projection on the piston body can engage radially, in order to prevent a relative rotation between the securing element and the piston body.

The securing element needs only be held by way of the positively locking connection. In accordance with exemplary embodiments, it is not held by way of staking or a welded joint. The connection is therefore releasable. The securing element can also be held, however, by way of a clicker or a clicker effect. In this case, the securing element is self-locking, since it latches directly into the piston body by way of a deflection (for example, in an annular depression).

The following materials can optionally be used: the sealing element comprises rubber or a plastic, the piston body comprises a plastic or metal, the securing element comprises a plastic or metal.

The piston body optionally has a shape of a hollow cylinder or cylinder. The sealing element and the securing element can be configured on a radially inner surface and/or on a radially outer surface.

Exemplary embodiments also relate to an electropneumatic modulator for a (pneumatic) brake system of a utility vehicle. The modulator comprises: an above-described pneumatic piston and a piston housing with a chamber for receiving the pneumatic piston.

Exemplary embodiments also relate to a method for producing a pneumatic piston, wherein the method comprises the following:

forming a piston body with a recess for receiving the sealing element;

inserting a sealing element into the recess of the piston body, in order to seal an intermediate space between the pneumatic piston and the piston housing; and locking the sealing element in the recess by way of a securing element.

It goes without saying that the recess and the sealing element can be of annular form.

The step of forming the piston body is optionally carried out by a folding core.

Exemplary embodiments overcome the disadvantages of the conventional pneumatic pistons by virtue of the fact that no welded joints and no staking are necessary between the piston body and a securing element. Instead, a positively locking connection is provided which meets even relatively high requirements in the long term. Here, a large sealing ring can be supported directly in the piston on a cheek. In this way, a stronger material is available, without a weld being required to this end. Since no welding process is required, exemplary embodiments offer the advantage that production can be carried out more inexpensively and rapidly and at the same time higher reliability is afforded.

The exemplary embodiments of the present invention will be better understood using the following detailed description and the appended drawings of the different exemplary embodiments which, however, should not be understood such that they restrict the disclosure to the specific embodiments, but rather serve merely for explanation and understanding.

DETAILED DESCRIPTION

Figure 1:
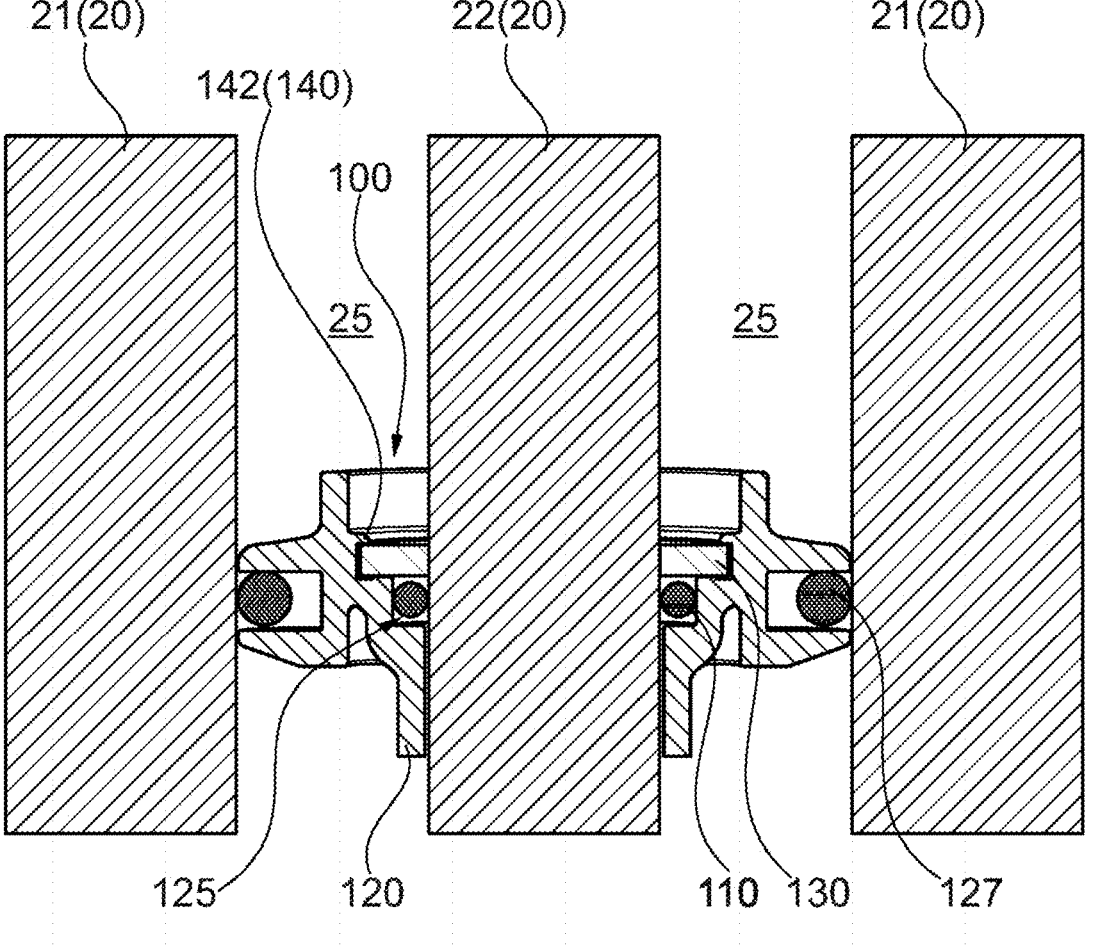
FIG. 1 shows a pneumatic piston in accordance with one exemplary embodiment of the present invention.

FIG. 1 shows one exemplary embodiment for a pneumatic piston 100 which is used in a chamber 25 of a piston housing 20. The pneumatic piston 100 is formed by way of example as a hollow cylinder, with the result that an inner through opening of the pneumatic piston 100 encloses a pin 22 of the piston housing 20 and adjoins an outer (cylindrical) wall 21. A sealing action between the piston body 120 and the pin 22 is provided by way of an annular sealing element 110 which is held on the piston body 120 by a securing element 130.

In accordance with exemplary embodiments, the securing element 130 is configured to axially hold the sealing element 110 in a positively locking manner in a recess 125 (for example, annular depression) of the piston body 120. A radial displacement is no longer possible at least after the insertion of the pneumatic piston 100 into the chamber 25, since the pin 22 and/or the piston body 120 prevent/prevents the movement.

The securing element 130 can be fixed on the piston body 120 by a locking element 140, wherein there are different possibilities to this end. In FIG. 1, the locking element 140 is configured by way of example as a groove 142 in the piston body 120, into which groove 142 the securing element 130 can be inserted. The fixing can take place before the insertion of the pneumatic piston 100 into the chamber 25, since the release of the securing element 130 after this is generally no longer possible (or only if the pneumatic piston 100 would be at least partially destroyed). A radial compression of the securing element 130 would namely be necessary for release, which is prevented by way of the centrally arranged housing pin 22.

The sealing element 110 can be configured for sealing the connecting point between the piston body 120 and the housing 20 as an O-ring (for example, made from a rubber material), wherein the recess 125 for the O-ring can be configured as an enclosure. The securing element 130 holds the O-ring 110 in the enclosure 125, for example, by way of what is known as a circlip (securing ring or snap ring) which engages into the groove 142 of the piston body 120 and is therefore fixed firmly on the piston body 120. The sealing element 110 therefore also cannot move in the axial direction (stroke direction of the piston).

In the mounted state, as can be seen in FIG. 1, the securing element 130 cannot go astray, since a compression of the securing ring 130 is prevented by the inner pin 22 of the housing.

It is likewise possible in accordance with further exemplary embodiments for a further sealing element 127 to be fixed between the outer wall 22 and the piston body 120. This optional further sealing element 127 is accommodated in a further recess in FIG. 1. Here too, the axial fixing of the further sealing element 127 can take place via a further securing element (not shown) which once again establishes a positively locking connection to the piston body 120. Release would then be possible only via dismantling, to be precise for the same reasons as have been described for the inner securing ring 130.

The pneumatic piston 100, however, does not have to be a hollow-cylindrical shape, but rather can also be formed as a conventional cylinder. The housing pin 22 is then absent. In this case, there would be a sealing element 127 and a securing element only on a cylinder outer wall, but they could be configured there in the same way as in the described cylinder inner wall of the hollow cylinder which is shown.

The securing ring 130 can comprise, for example, a plastic material or metal. The piston body 120 can also comprise a plastic material, and the sealing element 110 can comprise a rubber material.

Figure 2:
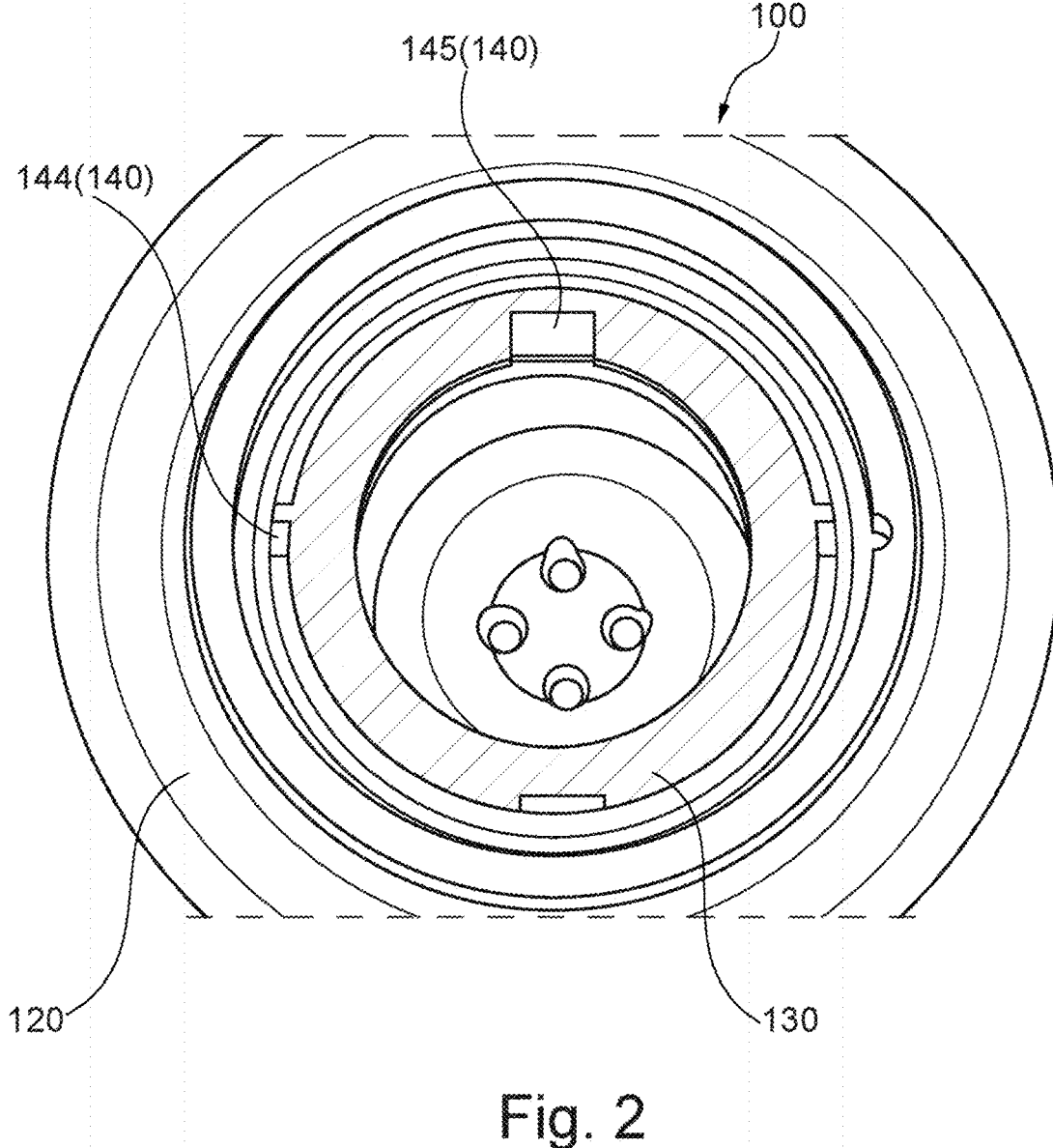
FIG. 2 shows a further exemplary embodiment for the pneumatic piston.

FIG. 2 shows a further exemplary embodiment for the pneumatic piston 100, in the case of which the securing element 130 is a disk which lies on a shoulder portion of the piston body 120 perpendicularly with respect to the axial direction. The disk 130 can be displaced radially and/or laterally, and is fixed by way of locking elements 140. The locking elements 140 are configured as undercuts 144, behind which the disk 130 (securing element) engages and is therefore held in its axial position perpendicularly with respect to the plane of the drawing.

It is no longer possible for the disk 130 to be pushed out after the insertion of the pneumatic piston 100 into the piston housing 20, since the inner housing pin 22 (see FIG. 1) prevents a radial displacement of the securing element 130. The disk 130 is therefore again held reliably in the undercuts 144. The disk 130 cannot rotate (around the axial axis) either, since a projection 145 of the piston body 120 engages into an indent of the disk 130 and holds the disk 130 such that it cannot rotate.

Figure 3:
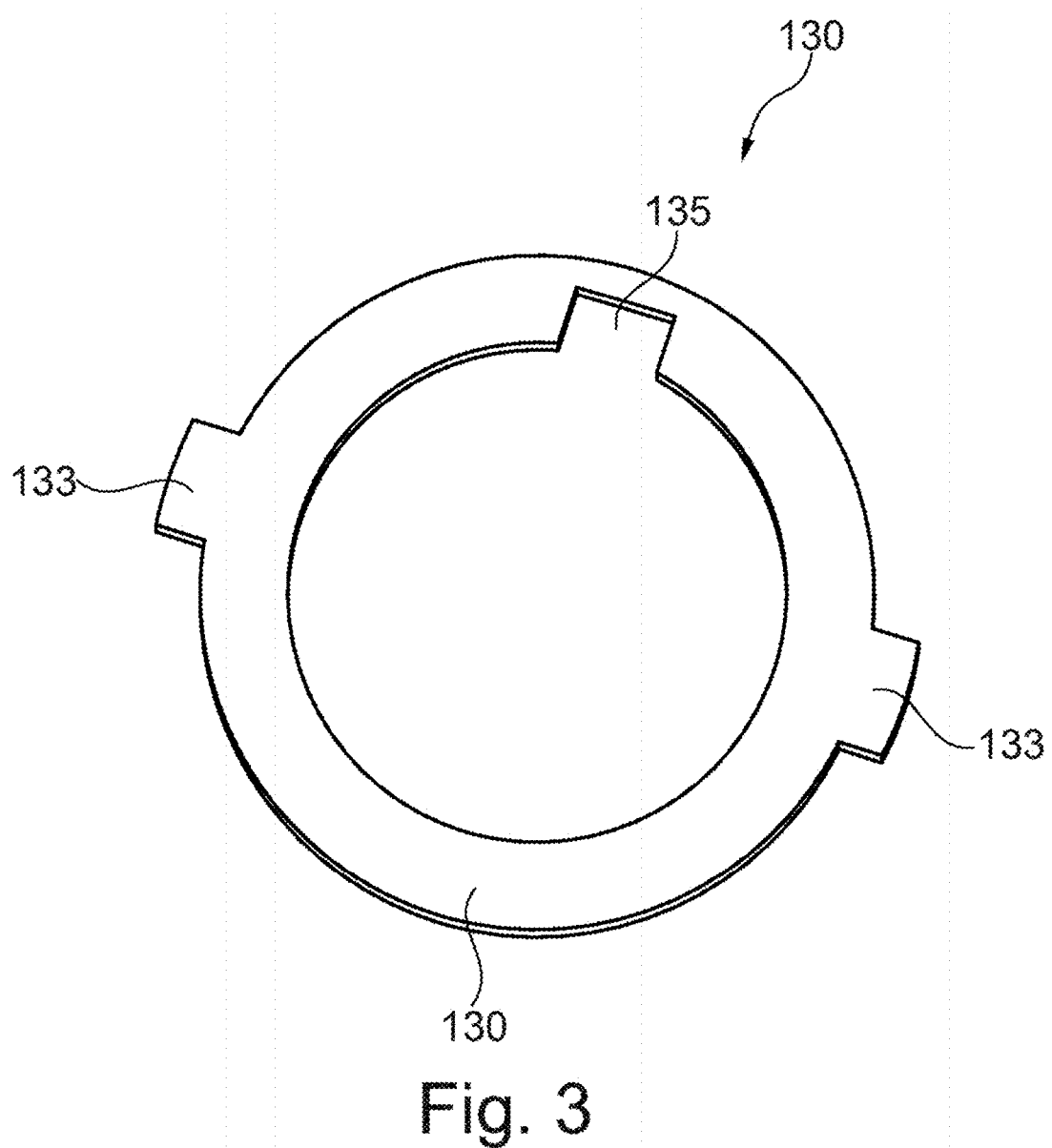
FIG. 3 shows one possible embodiment of the securing element, as can be used as a washer in FIG. 2.

FIG. 3 shows one possible embodiment of the securing element 130, as is shown as a disk in FIG. 2. The disk 130 is of annular configuration and has radially outwardly pointing projections 133 and a radial indent 135, into which the locking elements 140 from FIG. 2 can engage. As a result, the securing element 130 is again held in all spatial directions. The engagement of the locking elements 140 into the indent 135 prevents rotation, and the engagement around the projections 133 (by way of the undercuts 144) prevents an axial displacement. A radial displacement is again prevented by way of the central pin 22 (see FIG. 1) which engages into the central opening of the disk 130 with only a small amount of play.

In accordance with further exemplary embodiments, the securing element 130 is formed by way of two half rings (not shown in the figures) which can engage, for example, into the groove 142 from FIG. 1 of the piston body 120. The two half rings are in turn configured to be so thick in the radial direction that the housing pin 22 can fit in centrally with only a small amount of play and the half rings can afterward no longer be removed from the groove 142 (or only after the removal of the piston 100 from the housing).

Figure 4A:
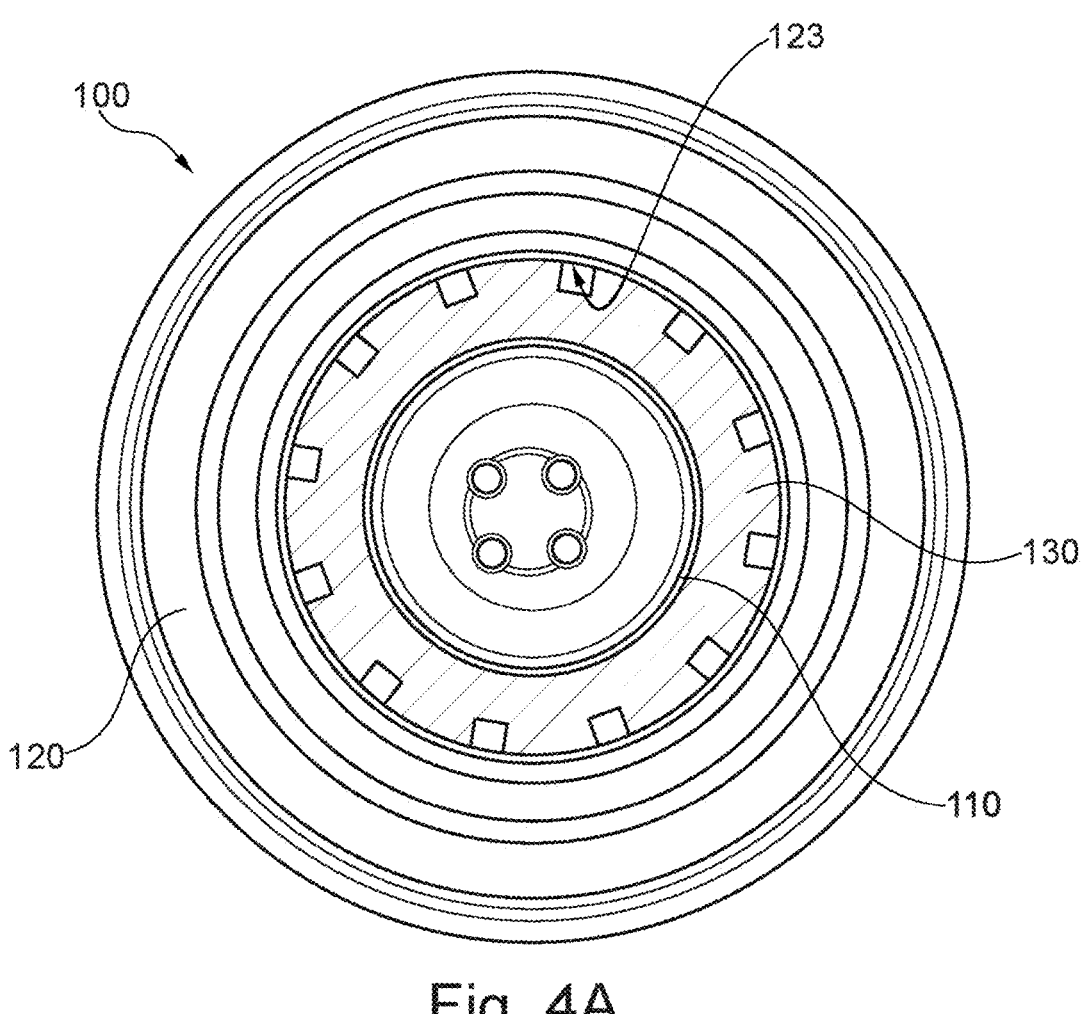
FIGS. 4A, 4B show a plan view and a cross-sectional view of the securing element, as can be configured as a toothed corrugated washer in accordance with further exemplary embodiments.

FIG. 4A shows a plan view of a further exemplary embodiment, in the case of which the securing element 130 is configured as a toothed corrugated washer which can be inserted into an annular depression 123 of the piston body 120. An external diameter of the corrugated washer 130 is selected to be somewhat greater than an internal diameter of the annular depression 123. As a result, it becomes possible that the corrugated washer 130 is pressed by what is known as the click effect or as a clicker into the annular depression 123. The outer teeth of the corrugated washers 130 latch into the piston body 120 and provide stable retention for the sealing element 110 which lies underneath in this metastable state by way of the deflection.

Figure 4B:
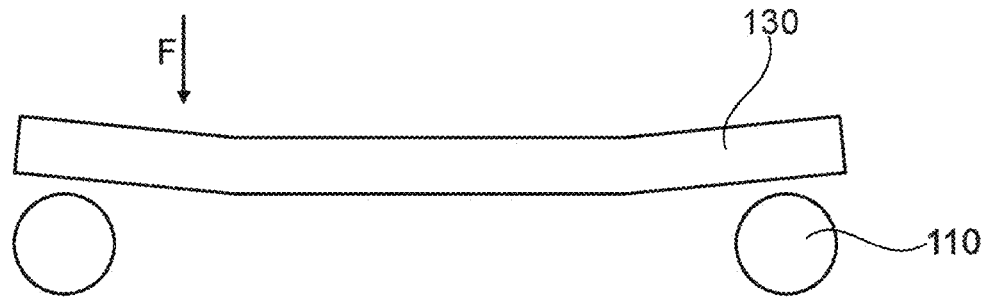

FIG. 4B shows the exemplary embodiment from FIG. 4A in a cross-sectional view along the axial direction through the sealing ring 110 and through the corrugated washer 130 which lies above it. The corrugated washer 130 is fixed by being pressed down along the arrow F, which, as a consequence of the greater diameter of the corrugated washer 130 in comparison with the annular depression 123, leads to bending of the corrugated washer 130 and, as a result, to it being pressed into the piston body 120. On account of the flexural stress, the corrugated washer 130 can no longer be released on its own, and the sealing ring 110 is reliably locked. No separate locking means 140 are provided in this case. Instead, the locking takes place by way of the specific geometry and/or dimensions of the securing element 130 and the piston body 120.

All previous connections between the securing element 130 and the piston body 120 were releasable. In accordance with further exemplary embodiments, however, optional permanent connections (for example, by way of welding, staking, laser, ultrasound, etc.) can be configured between the securing element 130 and the piston body 120. The securing element 130 can then also be configured as a simple disk.

Figure 5:
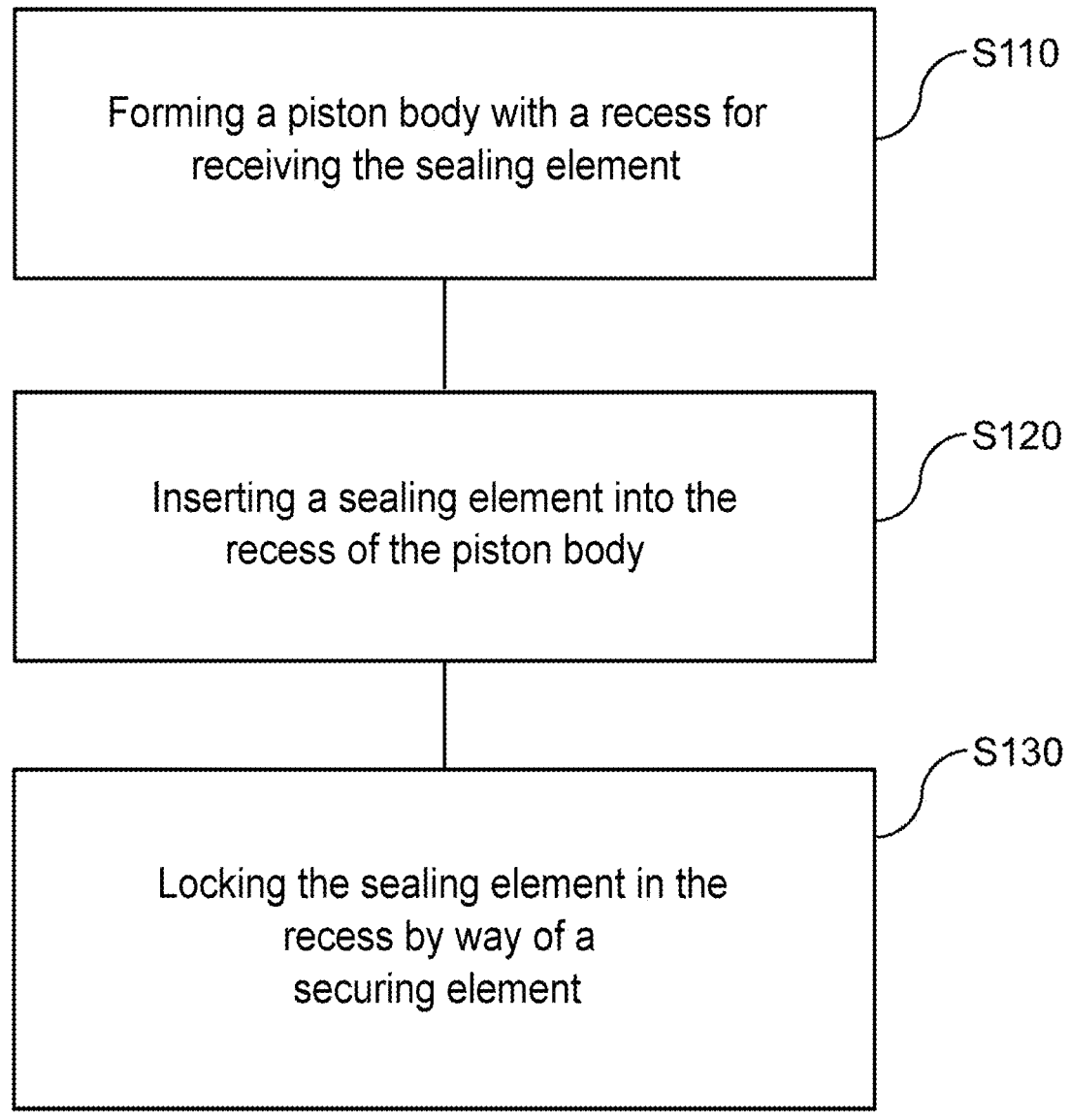
FIG. 5 shows a diagrammatic flow chart for a method for producing the pneumatic piston.

FIG. 5 diagrammatically shows a flow chart for a method for producing the pneumatic piston 100. The method comprises the steps:

forming S110 a piston body 120 with a recess 125 for receiving the sealing element 110;

inserting S120 a sealing element 110 into the recess 125 of the piston body 120, in order to seal an intermediate space between the pneumatic piston 100 and the piston housing 20; and locking S130 the sealing element 110 in the recess 125 by way of a securing element 130.

Figure 6:
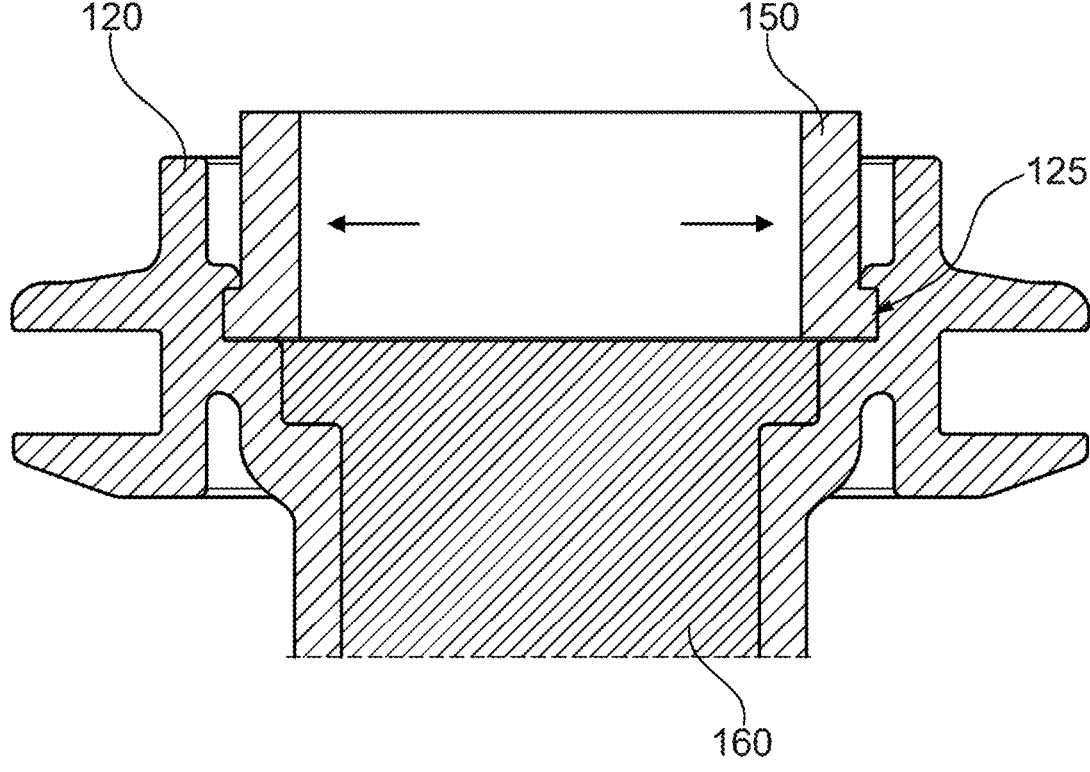
FIG. 6 illustrates the use of a folding core during the production of the pneumatic piston.

FIG. 6 shows one possible use of a folding core 150 (or collapsible core) for producing the piston body 120 with the recess 125. This is possible, in particular, when the piston body 120 is manufactured from a plastic material using injection molding. To this end, the folding core 150 is unfolded in the casting mold (only an inner mold 160 is shown in FIG. 6), as is indicated by way of the arrows in FIG. 6. After the exemplary injection molding, the folding core 150 can be pulled together again, with the result that the piston body 120 can be removed together with the recess 125.

It is likewise possible in accordance with a further exemplary embodiment that a folding core can be used for an O-ring groove. A securing ring is no longer required in this case, but there is a risk that the seal is compromised by way of a plurality of mold releases on the folding core.

It goes without saying that all the above-described features of the pneumatic piston 100 can likewise be configured by way of further optional method steps. Moreover, it goes without saying that the sequence in which they are named is not necessarily a sequence when the method steps are carried out. The steps can also be carried out in a different sequence or only part of the method steps are carried out.

Exemplary embodiments afford, inter alia, the following advantages:

The securing ring or the securing element 130 can form an additional guide for the piston, which leads to the advantage that a guide length is increased in the case of the inner piston guide. In this way, improved guidance is achieved.

The groove 142 in the piston can be produced inexpensively, for example by a folding core.

The features of the invention which are disclosed in the description, the claims and the figures can be essential to the implementation of the invention both individually and in any desired combination.

THE LIST OF DESIGNATIONS IS AS FOLLOWS

20 Piston housing
25 Chamber in the piston housing
100 Pneumatic piston
110, 127 Sealing element
120 Piston body
123 Annular depression
125 Recess/recesses
130 Securing element
133 Radial projection
135 Indent
140 Locking element
142 Groove
144 Undercut/undercuts
145,146 (Hook-shaped) projection
150 Folding core
160 Inner mold

The invention claimed is:

1. A pneumatic piston for an electropneumatic modulator, the electropneumatic modulator having a piston housing with a chamber for receiving the pneumatic piston, comprising:

a sealing element for sealing an intermediate space between the pneumatic piston and the piston housing;

a piston body with a recess for receiving the sealing element;

a securing element configured to fix the sealing element in the recess in a positively locking manner; and a locking element configured to lock the securing element on the piston body.

2. The pneumatic piston of claim 1, wherein the locking element includes at least one of the following: a groove; at least one undercut; and/or at least one hook-shaped projection.

3. The pneumatic piston of claim 1, wherein the securing element includes one of the following:

a securing ring, which is a snap ring, which can be latched into a groove of the locking element, two half rings which can be locked in a groove and/or in a at least one undercut and/or in at least one hook-shaped projection of the locking element, a toothed or non-toothed corrugated washer with a diameter which is selected so that the corrugated washer latches into the piston body during insertion, at least one projection which can be pushed into at least one undercut and/or into at least one hook-shaped projection, at least one indent, into which a projection on the piston body can engage radially, so as to prevent a relative rotation between the securing element and the piston body.

4. The pneumatic piston of claim 1, wherein the sealing element includes rubber or a plastic, and/or the piston body includes a plastic or a metal, and/or the securing element includes a plastic or a metal.

5. The pneumatic piston of claim 1, wherein the piston body has a shape of a hollow cylinder or a cylinder, and the sealing element and the securing element are on a radially inner surface.

6. An electropneumatic modulator for a brake system of a utility vehicle, comprising:

a pneumatic piston, wherein the electropneumatic modulator has a piston housing with a chamber for receiving the pneumatic piston, including:

a sealing element for sealing an intermediate space between the pneumatic piston and the piston housing;

a piston body with a recess for receiving the sealing element;

a securing element configured to fix the sealing element in the recess in a positively locking manner; and a locking element configured to lock the securing element on the piston body.

7. A method for producing a pneumatic piston, the method comprising:

forming a piston body with a recess for receiving the sealing element;

inserting a sealing element into the recess of the piston body, so as to seal an intermediate space between the pneumatic piston and a piston housing; and locking the sealing element in the recess by a securing element;

wherein a locking element locks the securing element on the piston body.

8. The method of claim 7, wherein the forming of the piston body is carried out by a folding core.

9. The electropneumatic modulator of claim 6, wherein the locking element includes at least one of the following: a groove; at least one undercut; and/or at least one hook-shaped projection.

10. The method of claim 7, wherein the locking element includes at least one of the following: a groove; at least one undercut; and/or at least one hook-shaped projection.

\* \* \* \* \*